Oct. 29, 1940.   P. M. McKENNA   2,220,018
PROCESS OF PRODUCING AN ARTICLE OF TORTUOUS SHAPE
Filed Feb. 20, 1939
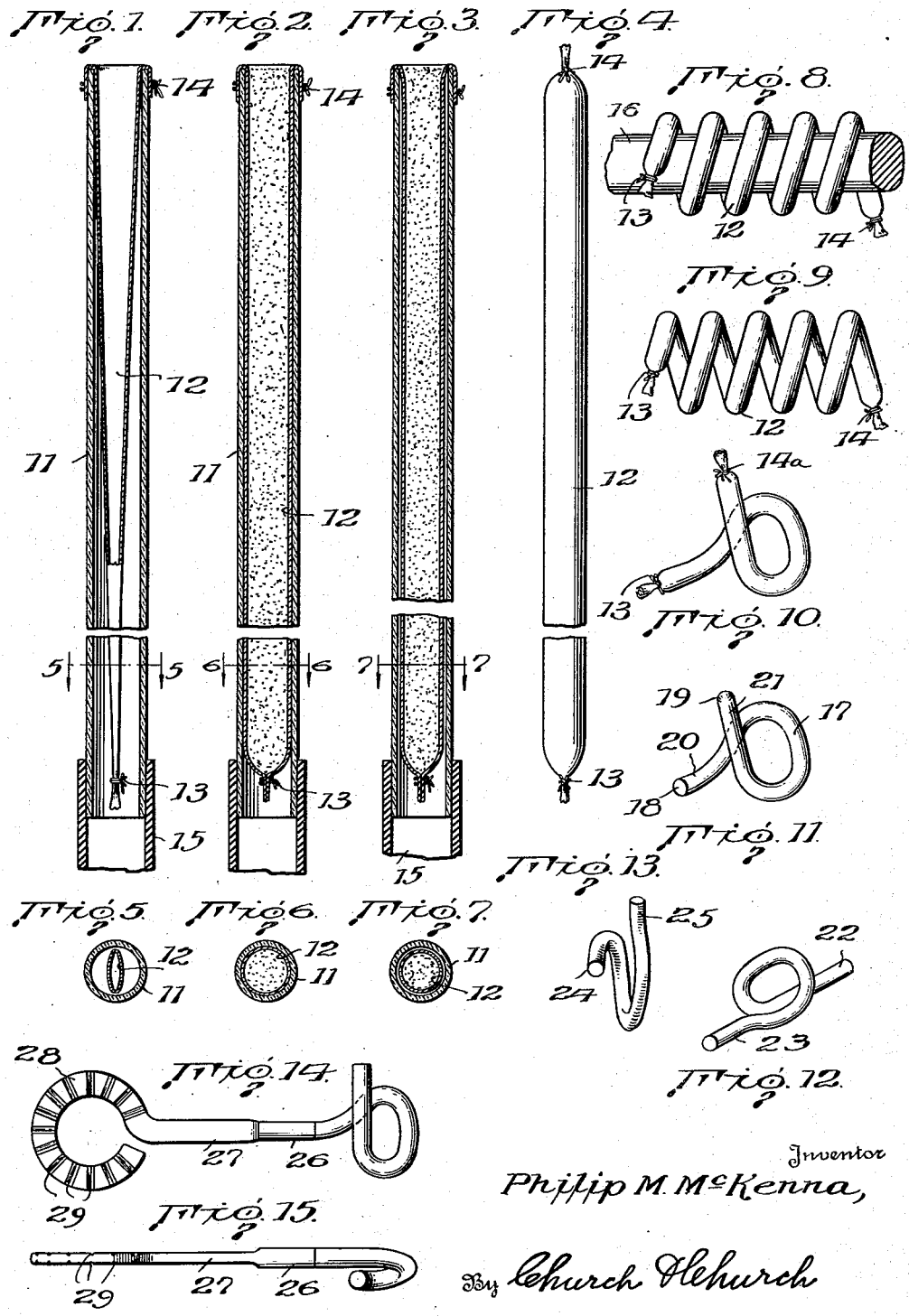
Inventor
Philip M. McKenna,
By Church & Church
His Attorneys Patented Oct. 29, 1940

2,220,018

UNITED STATES PATENT OFFICE 2,220,018

PROCESS OF PRODUCING AN ARTICLE OF TORTUOUS SHAPE

Philip M. McKenna, Unity Township, Westmoreland County, Pa., assignor to McKenna Metals Company, Latrobe, Pa., a partnership composed of Philip M. McKenna, Dorothy C. McKenna, Donald C. McKenna, Alex G. McKenna, and Alex G. McKenna, trustee Application February 20, 1939, Serial No. 257,510

6 Claims. (Cl. 75—137)

This invention relates to articles formed of sintered hard metal compositions and of a shape such that they cannot be readily molded so as to be of uniform density, or molded by dies, and to a process for making such articles. More particularly, the invention relates to articles of tortuous shape, and is herein disclosed as embodied with respect to pig-tail thread-guides which are of substantially uniform cross-section and are, at least in part, of a shape substantially corresponding to a helix.

Heretofore, articles composed of sintered hard metal compositions have been necessarily of simple shape, such that they could be formed by compressing, in dies, the finely divided particles of which they are made, or of shapes which could be readily molded by hand and had sufficient inherent rigidity to prevent breaking, such as balls. In any case, it is essential that such an article be greatly compressed, in order to cause the particles to cohere and form a shape-retaining body, so that they can be handled, and the sintering operation can be carried out, without danger of breakage.

One of the objects of the invention is to provide an article of unusual shape but having high resistance to abrasion. A further object is to provide an article composed of a sintered hard metal composition in shapes heretofore unattainable with such a composition. A still further object is to provide a method of making an article consisting, at least in part, of a sintered hard metal composition and of a shape which can not be molded in dies.

A further object is to produce a composite pig-tail thread guide which will efficiently resist abrasion and will have sufficient resiliency to withstand the stresses incident to use.

A still further object is to provide a method of making such an article in which the entire surface of the sintered hard metal composition will be of uniform density. Further objects are to provide such a process by which the danger of breakage of the articles is reduced to a minimum, and by which articles of uniform dimension, shape, and composition can be produced in quantity. Still further objects of the invention will be apparent from the following specification, when read in conjunction with the accompanying drawing, in which:

Figure 1 is an enlarged, fragmentary view in vertical section of an embodiment of means for carrying out the process of the invention;

Figs. 2 and 3 are enlarged, fragmentary views in vertical section, similar to Fig. 1, but illustrating successive stages in carrying out the process of forming a mass of comminuted particles enclosed in an envelope;

Fig. 4 is an enlarged fragmentary view illustrating the blank composed of the mass of comminuted particles enclosed in an envelope, after removal from the tube shown in Figs. 1 to 3;

Figs. 5, 6 and 7 are views in cross-section taken on the lines 5—5, 6—6 and 7—7 of Figs. 1, 2 and 3, respectively;

Fig. 8 is a view in front elevation, not enlarged, illustrating how the blank consisting of the envelope and its contents, shown in Fig. 4, may be shaped by winding it upon a mandrel;

Fig. 9 is a view in front elevation illustrating the blank shown in Fig. 8, after removal from the mandrel;

Fig. 10 is a view in perspective illustrating a portion of the blank shown in Figs. 4, 8 and 10, after further shaping of portions thereof;

Fig. 11 is a view of the body shaped as shown in Fig. 10, after it has been compressed and the envelope has been removed, and the ends have been flattened or otherwise finished;

Fig. 12 is a view in perspective of an article of modified shape;

Fig. 13 is a view in elevation of an article similar to that shown in Fig. 11, but of slightly modified shape;

Figs. 14 and 15 are views in side elevation and in plan, respectively, showing a pig-tail thread-guide composed of a wear portion of sintered hard metal composition integrally secured to a supporting shank of other material.

The invention is herein described with reference to pig-tail thread guides, and the method of making them, but it will be understood that it is applicable to any similar article of devious or tortuous shape, that is to say, to any article of substantially uniform cross-section and extending in a generally helical direction, or otherwise of such devious shape that it could not be molded by dies.

In general, the method comprises the formation of an intermediate body or blank which is substantially straight and of uniform cross-section, consisting of an envelope of a pliable, resilient, material such as rubber, filled with the finely divided particles of abrasion-resistant material and of matrix material, such particles being preferably moistened with, or mixed with, a small amount of a hydrocarbon lubricant, the wall of such envelope being under elastic tension so that the enclosed particles are under slight but uniform compression. Such blank is bent or otherwise distorted to correspond substantially to the desired shape of the finished article, allowance being made for a shrinkage of from 15% to 25%. The shaped blank retains its shape, and is then subjected to uniform pressure, preferably while submerged in an hydraulic chamber, exceeding 5000 pounds, and preferably of about 30,000 pounds, to the square inch. The particles are thereby compacted sufficiently to form a dense, rigid body capable of retaining its shape without the aid of the enclosing envelope. The envelope is then removed, the body is finished, if desired, for instance by rounding an exposed end, or flattening an end which is to be brazed or welded to a similar flat surface, and the body is then sintered in accordance with the usual practices of powder metallurgy.

The invention is applicable to any of the sintered metal compositions whch are now widely known and which consist predominantly of extremely minute particles of hard materials, such as carbides, nitrides, and borides of numerous metals mixed, with which are mixed particles of binder material or materials, such as nickel, cobalt, copper, zinc, iron, tungsten, molybdenum, carburized tungsten and carburized molybdenum, and which mixture is sintered, that is to say, heat treated under conditions such that the particles of hard material are cemented together by the binder material, in accordance with the well known principles of powder metallurgy.

A hydrocarbon lubricant is preferably used, though not essential. I prefer to grind the mixture of abrasion-resistant particles and the particles of matrix material together in a bath of naphtha, or similar hydrocarbon, and incompletely dry the mixture to leave the particles moistened with such hydrocarbon as a lubricant, in the amount of a few per cent of the entire mixture, but other lubricants such as lanolin, glycerine, tallow, paraffin, or graphite, may be used if desired.

The intermediary body, or blank, is preferably formed in a rigid tube 11, as shown in Figs. 1 to 3, which is preferably of glass because of its cheapness and uniformity. One end of a tube 12, of rubber, or similar material having an elastic limit of at least 100%, is tied shut by a string 13 and inserted within the tube 11, the upper end of the rubber tube being stretched over the upper end of the glass tube 11 so that air cannot enter between them, and a string 14 may be tied about the turned over portion, if desired, to assure that it will remain in place. The lower end of the glass tube 11 is connected, as by a rubber tube 15, to a suitable source of suction, and the rubber tube 12 is thereby dilated into contact with the inner wall of the glass tube 11. While the rubber tube 12 is thus dilated, the mixture of particles of abrasion-resistant material and of binder material is introduced thereinto, preferably by use of a funnel and the use of a wire which can act both as a tamping member and as a valve to facilitate filling of the tube.

The tube 12 having been filled, as illustrated in Fig. 2, the connection to the source of suction is interrupted and air is admitted to the lower end of tube 11, whereupon the inherent resiliency of the tube 12 will cause it to contract slightly, as illustrated in Fig. 3, the enclosed particles being thereby slightly compressed, but it is to be noted that the diameter of the rubber tube 12 under these conditions is materially greater than its normal diameter, so that the wall of such tube is under elastic tension circumferentially.

The folded-over, upper end of the tube 12 is then removed from the end of the rigid tube 11 and tied shut by the string 14 and, since the envelope 12 has contracted slightly, the blank constituted by such envelope and its contents may be readily slid out of the rigid tube 11 and appears as shown in Fig. 4. In order to insure uniform distribution of the material in the envelope 12, the blank may be rolled upon a flat surface, employing a slight pressure, but such step usually is not necessary.

The diameters of the tubes are dependent, of course, upon the thickness of the article which is to be made. Rubber tubing having a normal wall thickness from .02 inch to .002 inch has been used, and a wall thickness of .004 has been found to be satisfactory when the completed article is to have a thickness of about .125 inch. In general, the normal outer diameter of the elastic tube is approximately equal to one half that of the inner diameter of the rigid tube, and the inner diameter of the rigid tube must be sufficiently greater than that of the article desired to compensate for the shrinkage, which varies with the particular components of the composition, to compensate for twice the thickness of the wall of the distended rubber tube, and to compensate for the reduction in diameter of the blank that is due to the inherent elasticity of the rubber tube, which reduction in diameter is somewhat dependent upon the thickness of the wall of the rubber tube. In Figs. 8 to 15, articles having a diameter of approximately .125 inch are shown in full size, and it is to be noted that Figs. 1 to 7 are greatly enlarged in order to facilitate illustration.

The intermediary body or blank shown in Fig. 4 may be readily bent and, after bending, retains its shape unless the wall of the envelope is excessively thick or the bend unusually sharp. If such is the case, and the bent piece tends to straighten out, lead foil, or similar material, may be used to hold it in the shape desired. The blank may be shaped by hand, but is preferably wound upon a mandrel 16, as illustrated in Fig. 8, particularly when the desired curve is not uniform, as shown in Figs. 8, 10 and 11. A number of articles are usually made from a single blank, by tying strings 14a about the blank and then cutting the blank between such strings and, in forming the article shown in Figs. 10 and 11, the free ends are straightened out or bent to the particular shape desired by hand.

The bent blanks or pieces are then placed in the chamber of an hydraulic press, so as to be entirely submerged, and subjected to a pressure of at least 5000 pounds to the square inch, preferably about 30,000 pounds to the square inch. It will be understood, of course, that the particles of the composition are entirely enclosed by the envelope so that none of the water or other liquid in the hydraulic press can reach them. The pressure compacts the particles together uniformly, inasmuch as the pressure is uniform over the entire surface, and the thin wall of the elastic envelope contracts uniformly and remains in contact with the enclosed particles without the formation of folds or wrinkles. As a result of the pressure and compacting the particles are formed into a relatively dense body 17 that is quite rigid and somewhat brittle, but capable of being machined or filed and having a smooth surface.

The envelope 12 of rubber or similar material is removed in any suitable manner, preferably by subjecting the formed, compacted bodies to the action of toluol, or a similar agent, which swells and softens the rubber and renders it inelastic, so that it may be readily stripped from the body without danger of breakage. It will be appreciated that the rubber envelope may be otherwise removed, as by burning or by the use of carbon disulfide or other solvents, but the heat incident to burning of the rubber increases the danger of breakage and the use of carbon disulfide is objectionable because the sulfur is apt to react to some extent with certain of the particles of the composition.

The formed body may be smoothed or cut by a file, or similar tool, and in making a pig-tail thread-guide such as that shown in Figs. 11 to 15 the attached end is flattened, as shown at 18, and the free end is preferably rounded, as shown at 19.

The body 17 is then sintered in accordance with the principles of powder metallurgy. In carrying out the sintering step a number of such bodies are preferably heated together, in the chamber of an electric furnace, the atmosphere in said chamber being preferably a non-oxidizing atmosphere and preferably at a pressure below 40 microns of mercury, to a temperature of approximately 1400° C. It will be understood that the temperature used would be varied to suit the particular binder material, and that the other details in carrying out the sintering step could be correspondingly varied.

The thread-guides shown in Figs. 11 to 13 differ only slightly in shape. That shown in Fig. 11 has both its base end 20 and its free end 21 bent straight, while in that shown in Fig. 12 the curve is continued, so that the straight free end 22 extends in the same plane as the straight base end 23, and in the article shown in Fig. 13 the base end 24 is bent straight and the free end 25 is reversely bent to a slight degree.

The thread-guide bodies are integrally secured to a supporting shank of steel, brass or similar material having a modulus of elasticity much lower than, and preferably about or below half of, that of the thread-guide body, and capable of withstanding the strains and shocks incident to use. The modulus of elasticity of sintered hard metal compositions is generally in excess of 50,000,000, and the material of the supporting shank should have a modulus of elasticity below 30,000,000. The supporting shank may be of any convenient form, and as shown in Figs. 14 and 15 may be formed of round stock so as to comprise a round end portion 26 to which the end of the thread-guide body is integrally secured, preferably by a butt weld or by brazing, the rest of the support being flattened to substantially rectangular cross-section and constituting a straight portion 27, in line with the rounded portion 26, and a base-portion 28 curved substantially to circular form and preferably provided with a plurality of radially extending notches or grooves 29 to interlock with corresponding projections on a clamping member in which it may be adjustably and detachably secured.

It will be apparent that the process herein described will effect an article of sintered hard metal composition which, even though of unusual shape, will be of uniform density, and that because sintered hard metal compositions possess the property of extreme hardness, and consequently unusual resistance to wear, together with the capability of being welded or brazed, the composite thread-guides described herein are efficient and durable in use and can be economically manufactured in a wide variety of forms.

What is claimed is:

1. The process of producing an article of tortuous shape formed of a sintered hard metal composition, which comprises preparing an elongated blank consisting of a tube of resilient material closed at its ends and filled with a mixture of particles of abrasion-resistant material and matrix material, the wall of said tube being of substantially uniform thickness and under elastic tension, distorting said blank substantially to the desired shape, subjecting said shaped blank to hydraulic pressure to condense the mass of particles to form a rigid body, removing said tube from said body, and sintering said body.

2. The process of producing an article of tortuous shape formed of a sintered hard metal composition, which comprises enclosing in a distended envelope of resilient material a mixture of particles of abrasion-resistant material and matrix material, distorting said envelope and its contents while the wall of said envelope is under elastic tension to form the enclosed particles substantially to the shape desired, subjecting the entire surface of said envelope to hydraulic pressure to condense said particles into a rigid body, and sintering said body.

3. The process of producing an article of tortuous shape formed of a sintered hard metal composition, which comprises enclosing in an envelope of resilient material a mixture of minute particles of abrasion-resistant material and matrix material, bending said envelope and its contents to the desired shape, subjecting the surface of such shaped envelope to uniform pressure sufficiently great to condense the particles to a rigid body, removing said envelope, and sintering said body.

4. The process of producing an article of tortuous shape formed of a sintered hard metal composition, which comprises distending a tube formed of resilient material and of substantially uniform cross section, placing in said tube a mixture of particles of abrasion-resistant material and particles of metallic matrix material and a hydrocarbon lubricant, permitting said tube to contract and compress the mass of particles therein, distorting said tube and the mass of particles therein to the desired shape while the wall of said tube is under elastic tension, subjecting said formed shape to hydraulic pressure sufficient to condense said particles into a shape-retaining body, removing said tube from said body, and sintering said body.

5. The process of producing an article of tortuous shape formed of a sintered hard metal composition, which comprises placing in a rigid tube a tube of resilient material closed at one end with its other end in contact with one end of said rigid tube, applying suction to the open end of said rigid tube to distend said resilient tube against the wall of said rigid tube, introducing into said distended resilient tube a mixture of particles of abrasion-resistant material and matrix material, relieving the suction from said resilient tube to permit it to contract partially and thereby compress the contained particles, removing the resilient tube from the rigid tube and distorting it to form the contained particles to the desired shape, subjecting such formed, filled tube to uniform pressure sufficient to condense said particles into a shape-retaining body, and sintering said body.

6. The process of producing an article of tortuous shape formed of a sintered hard metal composition, which comprises enclosing in an elongated tube of rubber a mixture of particles of abrasion-resisting material and matrix material, distorting said envelope and its contents to form the enclosed particles substantially to the tortuous shape desired but to a size having slightly greater linear dimensions than those desired, subjecting the entire surface of said enclosing tube to uniform hydraulic pressure to condense said particles into a shape-retaining body, and sintering said body.

PHILIP M. McKENNA.